US012637815B2

(12) United States Patent
Lee et al.

(10) Patent No.: US 12,637,815 B2
(45) Date of Patent: May 26, 2026

(54) SMART ROAD MARKING CONSTRUCTION METHOD, SMART ROAD MARKINGS AND AUTONOMOUS DRIVING SYSTEM USING THE SAME

(71) Applicant: KOREA INSTITUTE OF CIVIL ENGINEERING AND BUILDING TECHNOLOGY, Goyang-si (KR)

(72) Inventors: Suk-Ki Lee, Gimpo-si (KR); Yongseok Kim, Goyang-si (KR); Won Il Park, Bucheon-si (KR); Ki-Soo Park, Paju-si (KR)

(73) Assignee: KOREA INSTITUTE OF CIVIL ENGINEERING AND BUILDING TECHNOLOGY, Goyang-si (KR)

( * ) Notice: Subject to any disclaimer, the term of this patent is extended or adjusted under 35 U.S.C. 154(b) by 146 days.

(21) Appl. No.: 18/495,439

(22) Filed: Oct. 26, 2023

(65) Prior Publication Data

US 2024/0301637 A1    Sep. 12, 2024

(30) Foreign Application Priority Data

Mar. 10, 2023    (KR) ........................ 10-2023-0031994

(51) Int. Cl.
E01C 23/20        (2006.01)
B60W 60/00        (2020.01)
(Continued)

(52) U.S. Cl.
CPC ............. E01F 9/30 (2016.02); B60W 60/001 (2020.02); E01C 23/166 (2013.01); E01C 23/20 (2013.01);
(Continued)

(58) Field of Classification Search
CPC .. E01F 9/30; E01F 9/518; E01F 9/524; E01C 23/166; E01C 23/20; B60W 60/001; B60W 2420/408; B60W 2552/53
(Continued)

(56) References Cited

U.S. PATENT DOCUMENTS 3,410,185 A * 11/1968 Harrington ........... E01C 23/206
                                              260/998.19
5,368,947 A * 11/1994 Denney ..................... C23C 4/12
                                                      404/19
(Continued)

FOREIGN PATENT DOCUMENTS

CA        2203503 C  * 10/2005
EP        0074494 A1 *  3/1983   .............. E01F 9/576
(Continued)

*Primary Examiner* — Raymond W Addie
(74) *Attorney, Agent, or Firm* — Studebaker Brackett PLLC

(57)                    ABSTRACT

The present invention relates to a smart road marking construction method, a smart road marking, and an autonomous driving system using the same. To this end, the smart road marking construction method according to an embodiment of the present invention comprises: a step (S10) of preparing a road marking composition by mixing a paint and a hardener; a step (S20) of forming a base layer 10 by applying the road marking composition to an upper surface of a road 1; a step (S30) of forming a bead layer 20 by applying glass beads 21 containing magnetic materials (M) to an upper surface of the base layer 10; and a step (S40) of allowing the resulting bead layer to be cured for a certain period of time. As a result, the lane recognition rate of autonomous vehicles by means of radar sensors can be improved, thereby addressing the limitations of conventional vision-based road markings.

8 Claims, 19 Drawing Sheets

<u>100</u>

(51) Int. Cl.

| | |
|---|---|
| *E01C 23/16* | (2006.01) |
| *E01F 9/30* | (2016.01) |
| *E01F 9/518* | (2016.01) |
| *E01F 9/524* | (2016.01) |

(52) U.S. Cl.
CPC .............. *E01F 9/518* (2016.02); *E01F 9/524* (2016.02); *B60W 2420/408* (2024.01); *B60W 2552/53* (2020.02)

(58) Field of Classification Search
USPC .......................................... 404/6–13, 75, 111
See application file for complete search history.

(56)                      References Cited

U.S. PATENT DOCUMENTS

| | | | | | |
|---|---|---|---|---|---|
| 5,599,133 | A | * | 2/1997 | Costello | E01C 23/22 |
| | | | | | 404/93 |
| 5,681,128 | A | * | 10/1997 | Morgan | E01F 9/553 |
| | | | | | 156/330 |
| 5,853,846 | A | * | 12/1998 | Clark | E01F 11/00 |
| | | | | | 340/901 |
| 6,468,678 | B1 | * | 10/2002 | Dahlin | E01F 9/512 |
| | | | | | 264/108 |
| 8,292,539 | B2 | * | 10/2012 | Gelfant | G02B 5/136 |
| | | | | | 404/12 |
| 8,647,013 | B2 | * | 2/2014 | Davies | E01C 23/24 |
| | | | | | 404/94 |
| 9,222,230 | B2 | * | 12/2015 | Jeganathan | C09D 5/004 |
| 9,567,716 | B2 | * | 2/2017 | Rainwater | B05B 13/005 |
| 9,701,846 | B2 | * | 7/2017 | Protzmann | E01F 9/524 |
| 9,892,296 | B2 | * | 2/2018 | Kovarik | G01S 13/74 |
| 2003/0123930 | A1 | * | 7/2003 | Jacobs | E01F 9/512 |
| | | | | | 404/12 |
| 2016/0230018 | A1 | * | 8/2016 | Fage-Pedersen | C03C 17/009 |
| 2018/0282955 | A1 | * | 10/2018 | McClendon | E01F 9/50 |

FOREIGN PATENT DOCUMENTS

| | | | | | | |
|---|---|---|---|---|---|---|
| EP | | 2416303 | A2 | * | 2/2012 | ................ E01F 9/30 |
| GB | | 2623288 | A | * | 4/2024 | ............. E01C 23/22 |
| JP | | 2001-311105 | A | | 11/2001 | |
| JP | | 2017-141595 | A | | 8/2017 | |
| JP | | 2019-214844 | A | | 12/2019 | |
| JP | | 2020-159115 | A | | 10/2020 | |
| KR | | 10-2041682 | B1 | | 11/2019 | |
| KR | | 10-2429684 | B1 | | 8/2022 | |

* cited by examiner

FIG. 1

FIG. 4A1
FIG. 4A2
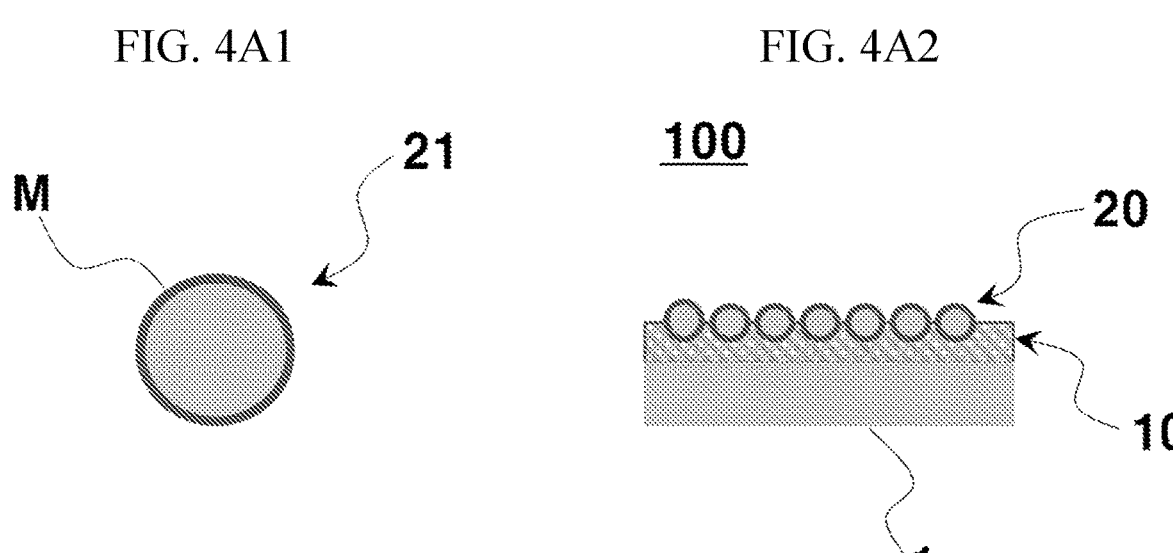
FIG. 4B1
FIG. 4B2
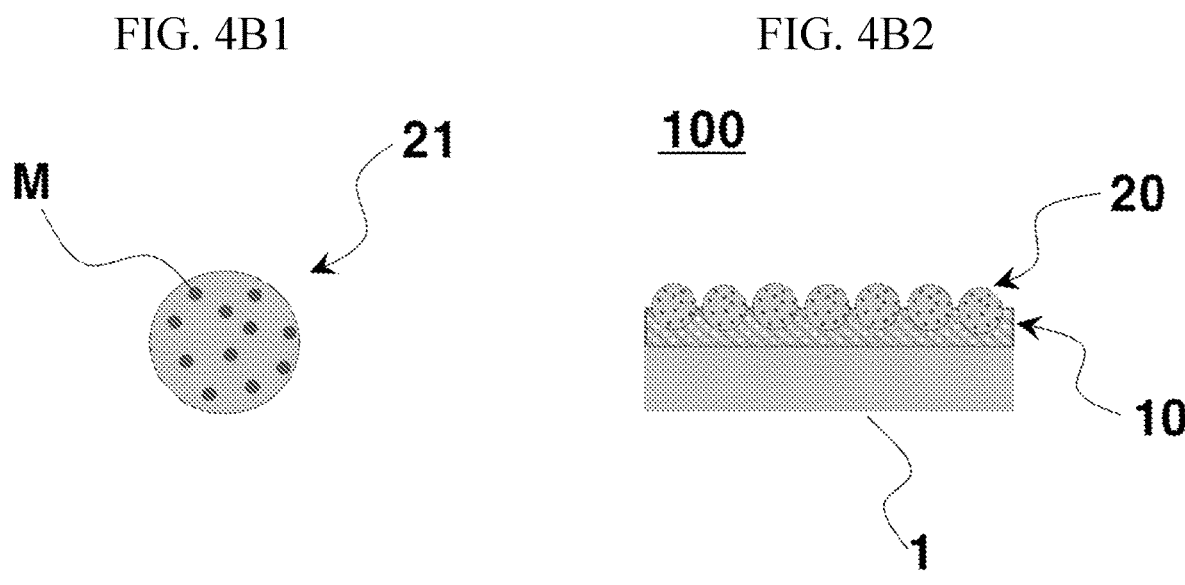

FIG. 4C1
FIG. 4C2
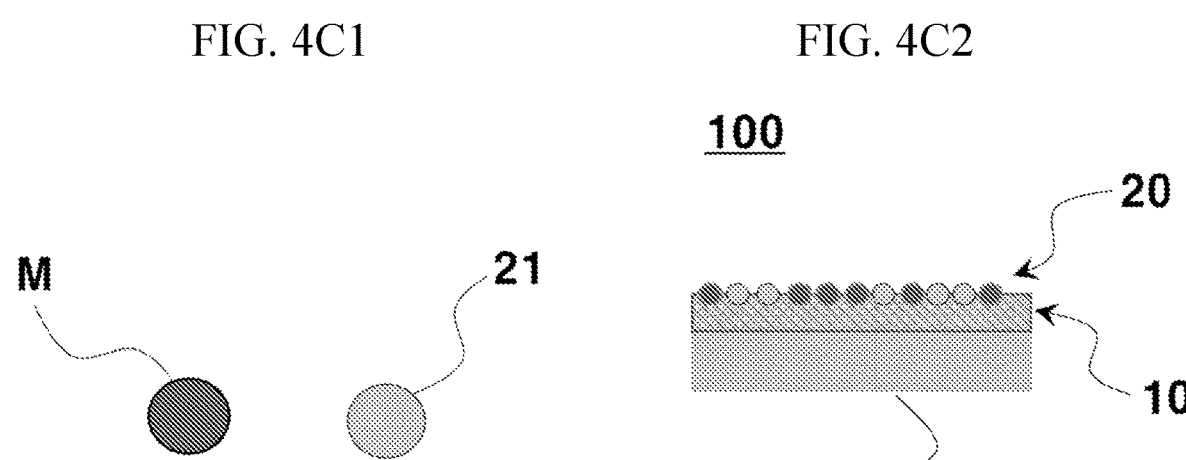
FIG. 5A
FIG. 5B
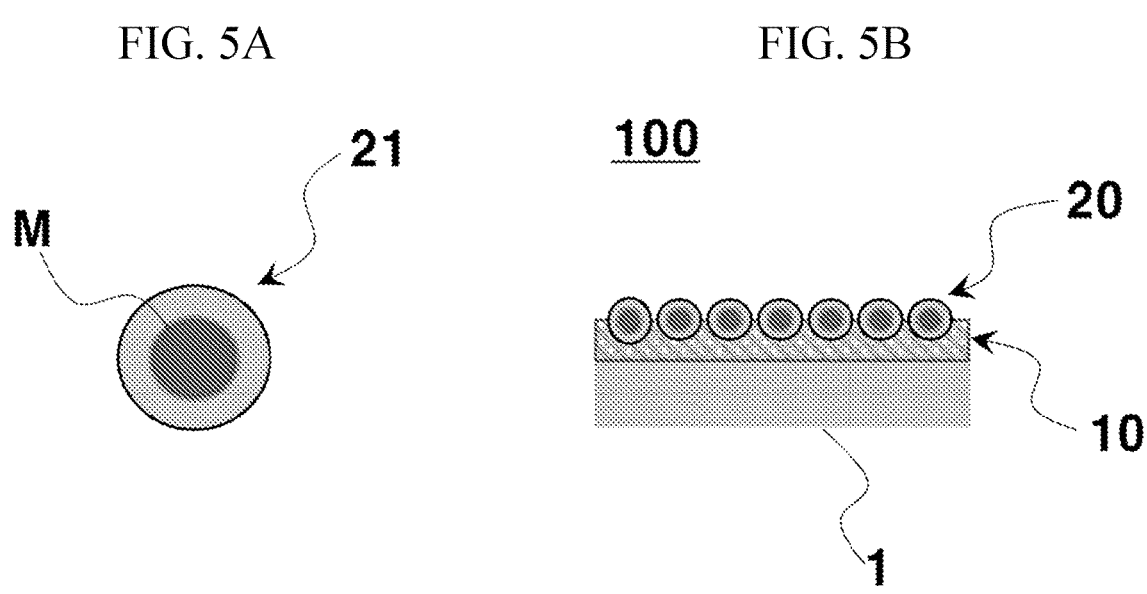

FIG. 6A1
FIG. 6A2
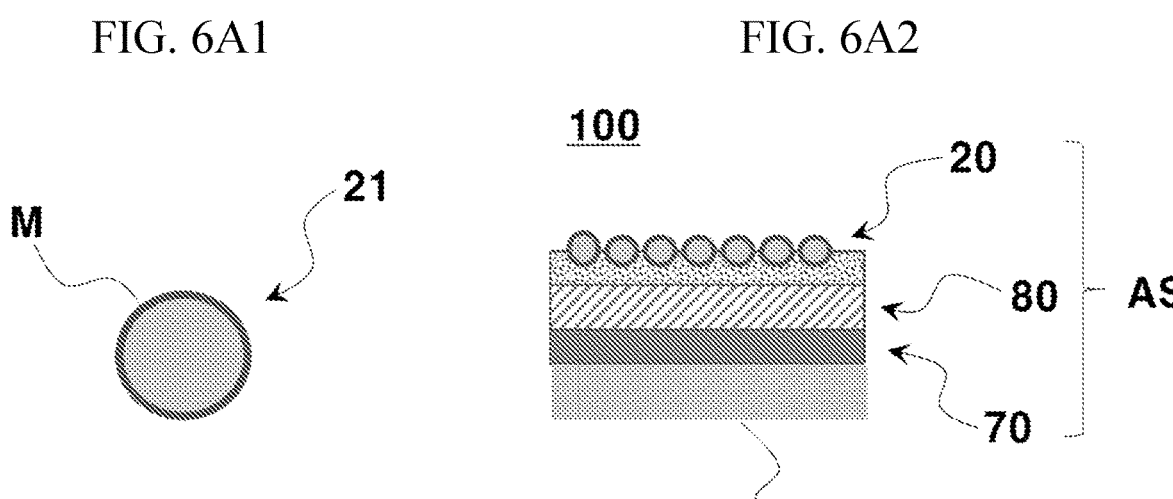
FIG. 6B1
FIG. 6B2
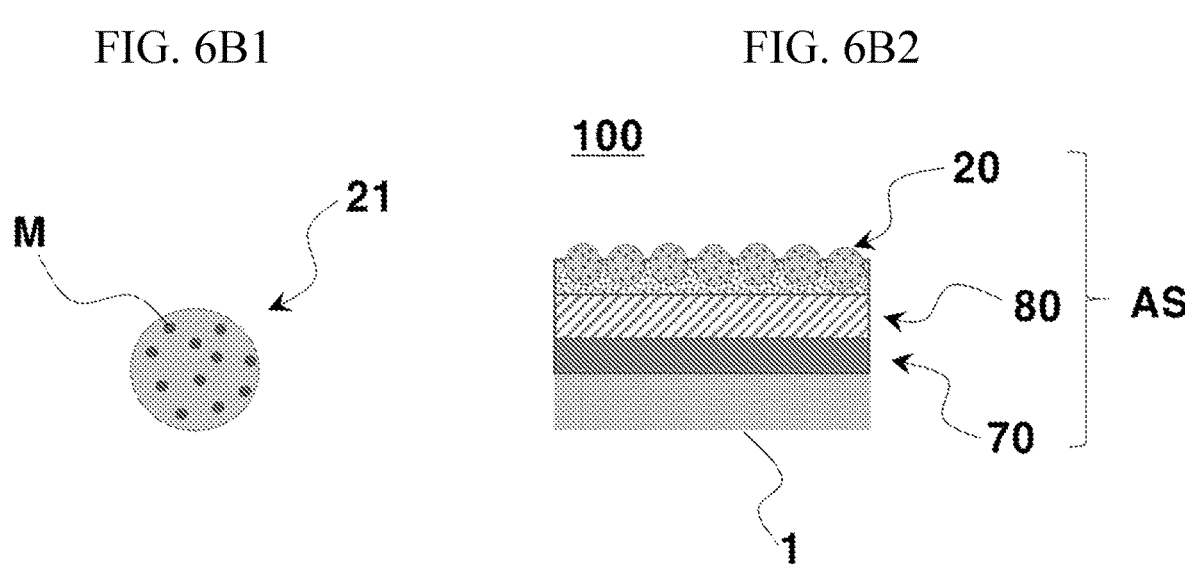

FIG. 12A                  FIG. 12B
FIG. 13A                  FIG. 13B
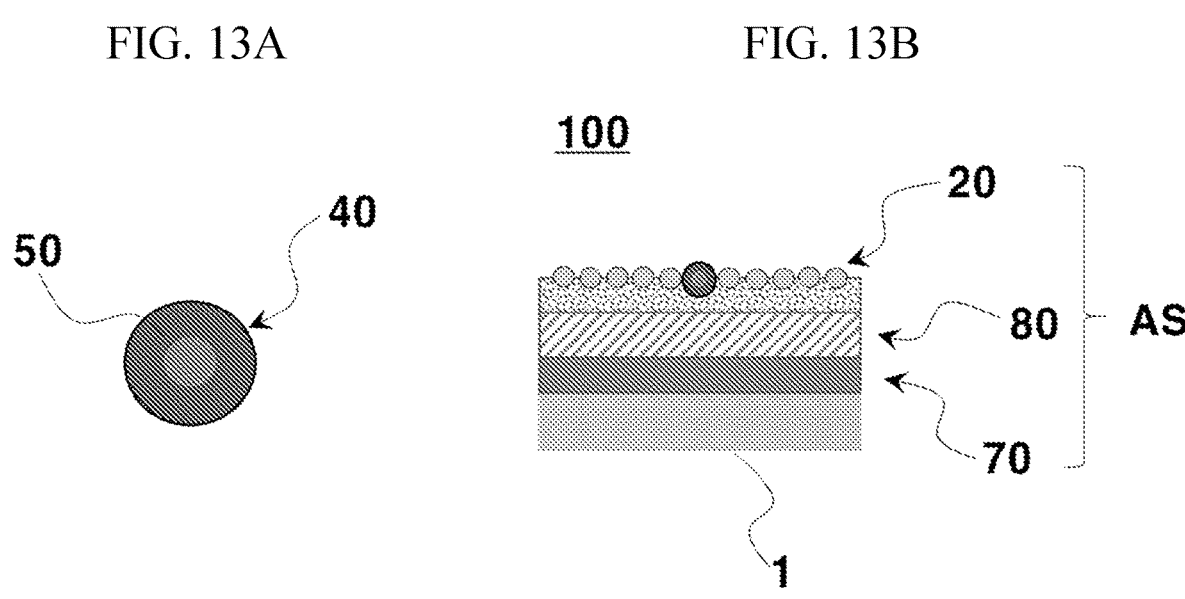

FIG. 15A
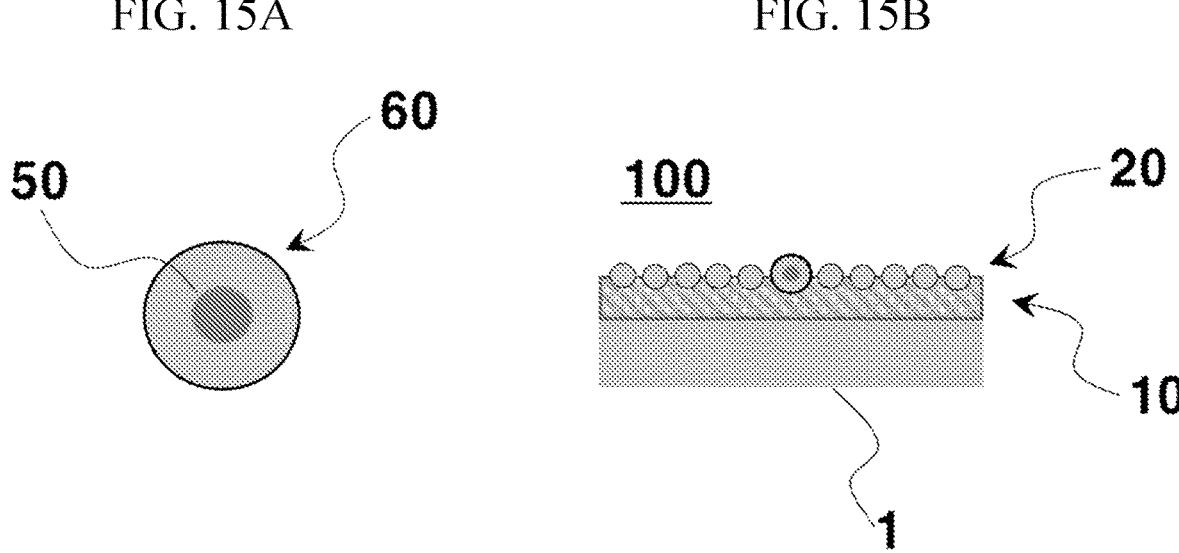
FIG. 15B
FIG. 15C
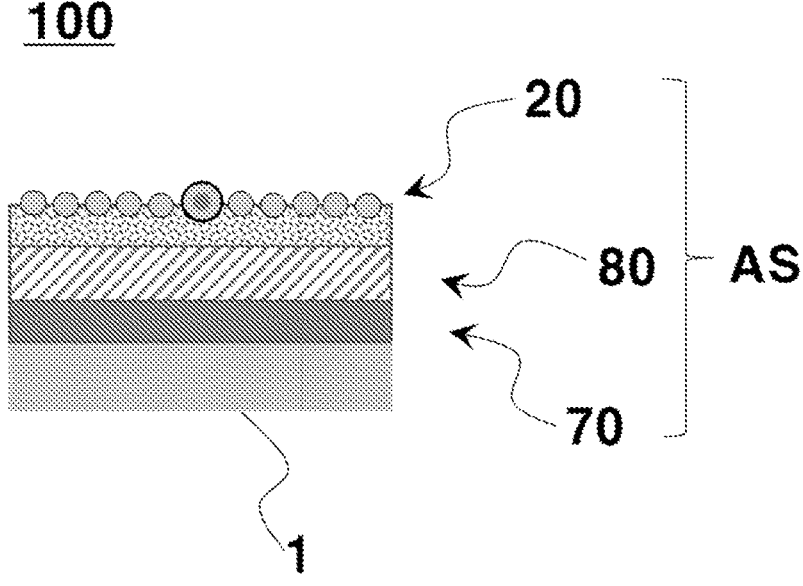

SMART ROAD MARKING CONSTRUCTION METHOD, SMART ROAD MARKINGS AND AUTONOMOUS DRIVING SYSTEM USING THE SAME

CROSS-REFERENCE TO RELATED PATENT APPLICATION

This application claims the benefit of Korean Patent Application No. 10-2023-0031994, filed on Mar. 10, 2023, in the Korean Intellectual Property Office, the disclosure of which is incorporated herein in its entirety by reference.

BACKGROUND OF THE INVENTION

1. Field of the Invention

The present invention relates to a smart road marking construction method, a smart road marking, and an autonomous driving system using the same, and more specifically, to a smart road marking construction method, a smart road marking, and an autonomous driving system using the same, which can improve the lane recognition rate by radar sensors of autonomous vehicles to address the limitations of conventional vision-based road markings by applying glass beads containing magnetic materials to a road marking to form a bead layer and allowing the resulting bead layer to be cured for a certain period of time.

2. Description of the Related Art

While current autonomous vehicles have not reached the fully autonomous driving stage where the driver is completely excluded, they have reached a stage where the system takes control of driving by perceiving the driving environment. In particular, most recently produced vehicles are equipped with sensor-based Advanced Smart Cruise Control (ASCC) system, Lane Departure Warning System (LDWS), and Lane Keeping Assist System (LKAS) as standard.

However, despite the advancements in autonomous vehicles, the road infrastructure on which vehicles drive has not improved at all. For instance, adverse weather conditions, high-density urban areas, tunnels, etc. can reduce the sensor recognition rate, and this reduced sensor recognition rate paradoxically increases the likelihood of major accidents as the level of autonomous driving further advances.

Recently, cooperative autonomous driving has emerged as a solution to enhance the safety by allowing autonomous vehicles to share information with each other through the road infrastructure. For example, at night or in adverse weather conditions such as in snow or rain, the lanes may not be clearly identified by the naked eyes of regular drivers and by the cameras of driving vehicles.

In other words, the current road markings are primarily focused on improving retroreflectivity; however, as shown in FIG. 1, the current autonomous driving system extracts the lane areas from images captured by cameras to identify road markings such as lanes, and as a result, the recognition rate is inevitably reduced at night or in adverse weather conditions.

Furthermore, as the wheel loads of vehicles are repeatedly applied to the road markings at curved sections, merging sections, diverging sections, intersections, etc. the road markings are worn out by the frictional force and thus are not identified by cameras.

To solve these problems, the applicant has proposed a solution in Korea Patent No. 10-2429684 (registered on Aug. 2, 2022, hereinafter referred to as the "prior art document"). The prior art document suggests applying a detection paint containing conductive powders such as iron (Fe), silver (Ag), aluminum (Al), copper (Cu) or nickel (Ni), as well as metallic glass, to the top of a lane paint, allowing the vehicle's radar sensor to detect the resulting lane and control the vehicle's movement.

The prior art document discloses the technical idea of applying the detection paint to the top of the lane paint and then applying glass beads thereto. However, despite the sequential application of the detection paint and the glass beads, it would be difficult to expect that the detection paint containing conductive powders and metallic glass remains stably attached without detaching even under repeated wheel loads.

REFERENCES OF THE RELATED ART

Patent Document 1
   Korean Patent No.: 10-2429684 (Registered on Aug. 2, 2022).

SUMMARY OF THE INVENTION

The present invention has been made in an effort to solve the above-described problems associated with prior art, and an object of the present invention is to provide a smart road marking construction method, a smart road marking, and an autonomous driving system using the same, which can allow the smart road marking to be recognized by a radar sensor without the reliance on vision-based road markings, while meeting the retroreflective performance of conventional road markings, which therefore makes it possible for driving vehicles to accurately recognize the smart road marking even in adverse weather conditions or environmental obstacles and also makes it possible to provide road marking information even when the visual road markings are worn out, thus enabling a smarter autonomous driving.

In order to achieve the above-described object, an embodiment of the present invention provides a smart road marking construction method (SM) comprising: a step (S10) of preparing a road marking composition by mixing a paint and a hardener; a step (S20) of forming a base layer 10 by applying the road marking composition to an upper surface of a road 1; a step (S30) of forming a bead layer 20 by applying glass beads 21 containing magnetic materials (M) to an upper surface of the base layer 10; and a step (S40) of allowing the resulting bead layer to be cured for a certain period of time.

The magnetic material (M) may be coated on the surface of the glass bead 21 or may be inserted therein.

Another embodiment of the present invention provides a smart road marking 100 comprising an adhesive sheet (AS) to be attached to an upper surface of a road 1, wherein the adhesive sheet (AS) is provided with an adhesive layer 70 to be attached to the asphalt or road surface, a road marking layer 80 is integrally laminated on the top of the adhesive layer 70, and a bead layer 20 comprising glass beads 21 containing magnetic materials (M) is integrally attached to an upper surface of the road marking layer 80.

A magnetic marker 40 is attached to an upper surface of the road marking layer 80.

The magnetic marker 40 may comprise an RFID tag 50 inserted therein.

Yet another further embodiment of the present invention provides a smart road marking construction method (SM) comprising: a step (S10) of preparing a road marking composition by mixing a paint and a hardener; a step (S20) of forming a base layer 10 by applying the road marking composition to an upper surface of a road 1; a step (S30) of forming a bead layer 20 by applying glass beads 21 to an upper surface of the base layer 10; a step (S40) of allowing the resulting bead layer to be cured for a certain period of time; a step (S50) of forming an insertion hole 30 by grinding the bead layer 20 and the base layer 10 to a predetermined diameter and depth; a step (S60) of applying an adhesive 31 to the inside of the insertion hole 30; and a step (S70) of inserting a magnetic marker 40 into the insertion hole 30.

The magnetic marker 40 may comprise an RFID tag 50 inserted therein.

The smart road marking construction method (SM) may further comprise a step (80) of forming the same level as the adjacent bead layer 20 in the insertion hole 30 by applying glass beads 21 to the top of the magnetic marker 40.

The insertion hole 30 may comprise a deformation inducing portion 35 whose cross-section is extended toward one side, and the magnetic marker 40 is made of a ductile material to be deformed into the deformation inducing portion 35 by an upper load.

A further embodiment of the present invention provides an autonomous driving system (S) using a smart road marking comprising: a smart road marking 100 including a magnetic material (M) or a magnetic marker 40; a radar sensor 200 that is mounted on a vehicle to recognize road marking information including the location from the smart road marking 100; and a driving assistance device 300 that controls the vehicle's movement based on the road marking information recognized by the radar sensor 200.

The smart road marking 100 may comprise an RFID tag 50, and the autonomous driving system (S) may further comprise: an RFID receiver 400 that is mounted on the vehicle to recognize road marking information including the location from the RFID tag 50; and a central control server 500 that receives information about the driving vehicle in real time from the RFID receiver 400.

According to the smart road marking construction method, the smart road marking, and the smart road autonomous driving system (S) using the same according to the embodiments of the present invention, the glass beads 21 containing magnetic materials applied to the road marking allows for a driving vehicle to accurately recognize the road marking using a radar sensor even in adverse weather conditions or environmental obstacles without the reliance on vision-based road markings, while meeting the retrore-flective performance of conventional road markings.

Furthermore, according to another embodiment of the present invention, the magnetic marker inserted into the road marking allows for a driving vehicle to accurately recognize road markings using a radar sensor.

As a result, even when the road marking applied to the surface of the road is worn out for various reasons, it is possible to continue to provide road marking information to the driving vehicle equipped with a radar sensor.

In addition, the RFID tag inserted into the magnetic marker allows providing basic road marking information to the driving vehicle, as well as other road environment information.

In particular, depending on the embodiment, it is possible to provide the driving vehicles with traffic information based on specific characteristics of the road or lane, such as speed limit information for the road, information about the entry of general vehicles into bus-only lanes, information about entry times for variable lanes, traffic conditions based on the number of vehicles passing for a specific period of time, information about lane change permissions, etc.

Moreover, by means of the magnetic marker made of a ductile material and the deformation inducing portion formed in the insertion hole make it possible to maintain the adhesion without detaching even under repeated wheel loads of vehicles, thus ensuring long-term durability.

BRIEF DESCRIPTION OF THE DRAWINGS

The above and other features and advantages of the present invention will become more apparent by describing in detail exemplary embodiments thereof with reference to the attached drawings in which:

FIG. 1 is a graph illustrating the lane recognition rate of LDWS depending on day and night weather conditions;

FIGS. 4A1 to 4C2 are conceptual cross-sectional views illustrating a smart road marking using glass beads and depending on painting methods according to various embodiments of the present invention;

FIGS. 5A to 5B are conceptual cross-sectional views illustrating a smart road marking using glass beads and depending on a painting method according to a preferred embodiment of the present invention;

FIGS. 6A1 to 6C2 are conceptual cross-sectional views illustrating smart road markings using glass beads and depending on sheet adhesion methods according to various embodiments of the present invention;

FIGS. 12A to 12B are conceptual cross-sectional views illustrating a smart road marking using a magnetic marker provided with an RFID tag and depending on a painting method according to an embodiment of the present invention;

FIGS. 13A to 13B are conceptual cross-sectional views illustrating a smart road marking using a magnetic marker provided with an RFID tag and depending on a sheet adhesion method according to an embodiment of the present invention;

FIGS. 15A to 15C are conceptual cross-sectional views illustrating a glass block provided with an RFID tag and a smart road marking using the same according to an embodiment of the present invention.

DETAILED DESCRIPTION OF THE INVENTION

Hereinafter, preferred embodiments of the present invention will be described in detail with reference to the accompanying drawings.

Figure 2:
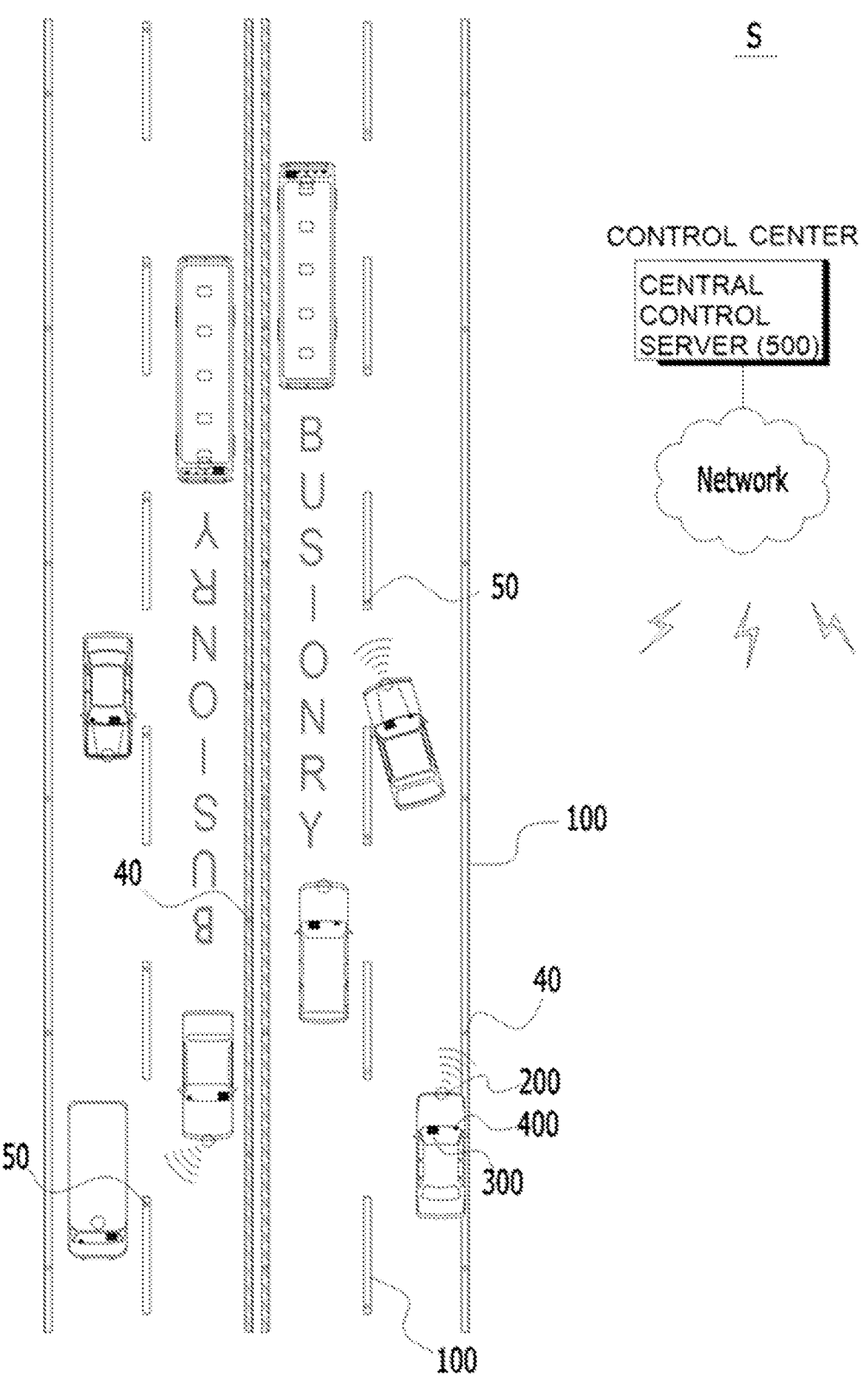
FIG. 2 is a conceptual diagram illustrating an autonomous driving system using smart road markings according to an embodiment of the present invention.

A smart road marking construction method (SM) of the invention along with a smart road marking 100 of the present invention are intended to be applied to an autonomous driving system (S) which is designed to allow a driving vehicle to obtain road marking information using a radar sensor 200 mounted on the vehicle, even in the case where the vision-based image sensing is difficult due to adverse weather conditions or worn road markings as shown in FIG. 2, thereby achieving the autonomous driving of the vehicle.

Figure 3:
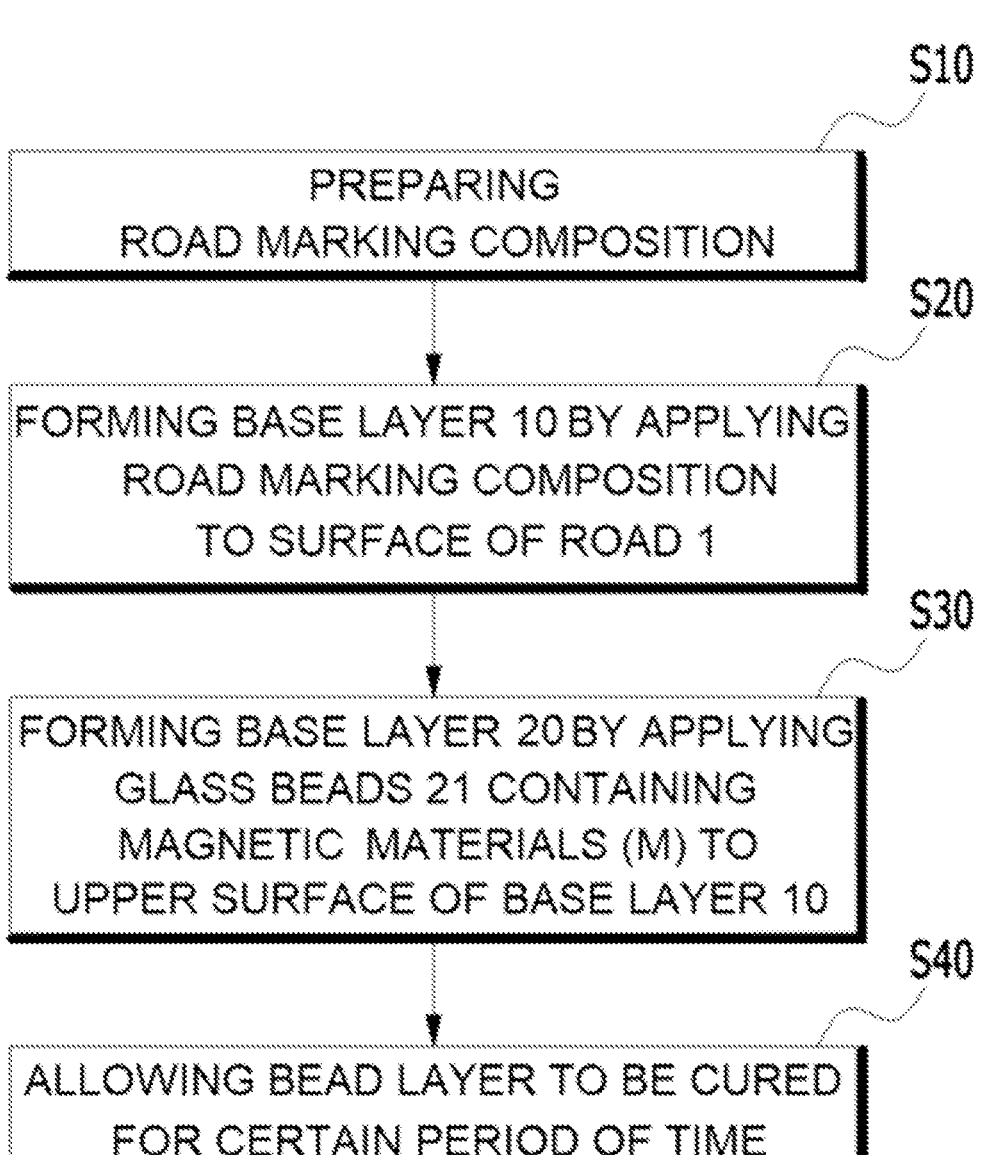
FIG. 3 is a block diagram illustrating a smart road marking construction method according to an embodiment of the present invention.

As shown in FIG. 3, the smart road marking construction method (SM) according to an embodiment of the present invention is based on a painted road marking and may comprise a road marking composition preparation step (S10), a base layer forming step (S20), a bead layer forming step (S30), and a curing step (S40).

First, the road marking composition preparation step (S10) is the step of preparing a road marking composition by mixing a paint and a hardener, in which the road marking composition is prepared by mixing a coloring paint and a synthetic resin hardener as main ingredients to have a color that matches the nature of the road marking, and melting the mixture by heating, and then homogeneously mixing the molten mixture on site.

Next, the base layer forming step (S20) is the step of forming a base layer 10 by applying the molten road marking composition to the surface of a road 1. However, it is desirable to remove any contaminants such as moisture, dust, oil, etc. remaining on the upper surface of the road, and a primer may be applied thereto depending on the embodiment. Moreover, it is desirable to maintain a relative humidity of 85% or less at a temperature higher than the dew point to prevent moisture condensation.

The bead layer forming step (S30) that follows is the step of forming a bead layer 20 by applying glass beads 21 containing magnetic materials (M) to the upper surface of the base layer 10. Each of the glass beads 21 forming the bead layer 20 of the present invention contains a magnetic material (M), and this magnetic material (M) may comprise at least one of iron (Fe), gold (Au), silver (Ag), and aluminum (Al), copper (Cu), and nickel (Ni) or a combination thereof.

Figure 1:
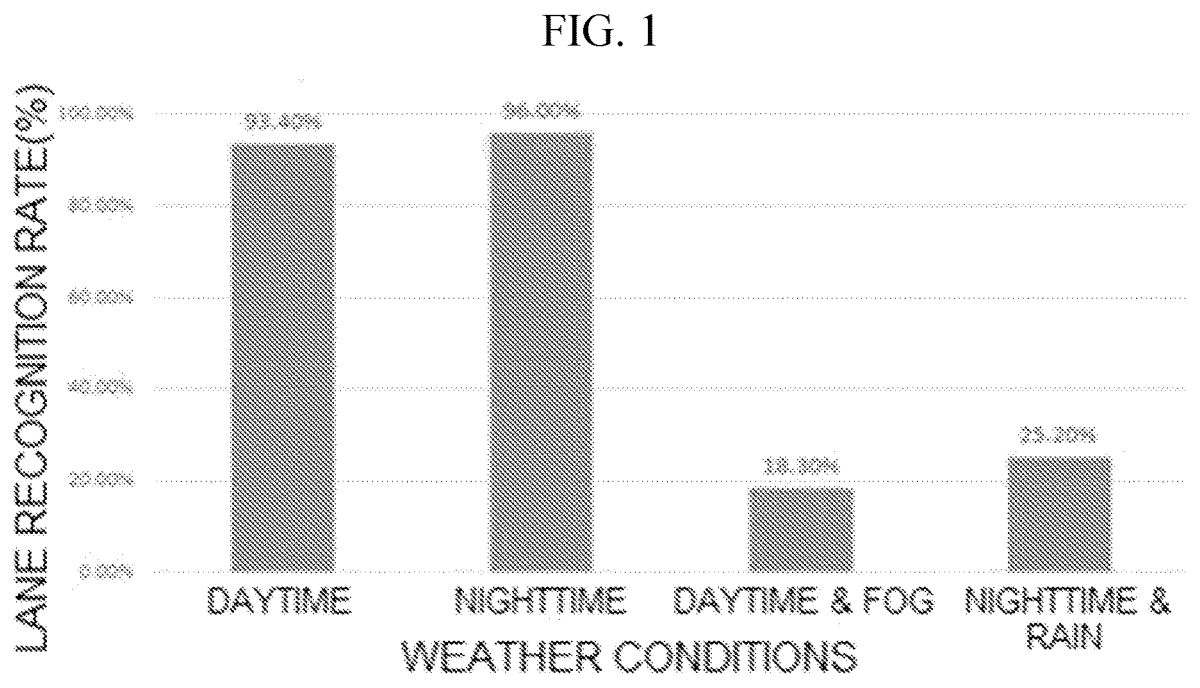

The glass bead 21 may be formed by applying a synthetic resin adhesive layer on the surface thereof and coating a magnetic material (M) onto the adhesive layer as shown in FIGS. 4A1 to 4A2, or by mixing finely divided magnetic materials (M) with a silica powder and melting the mixture by heating at a high temperature as shown in FIGS. 4B1 to 4B2. Moreover, as shown in FIGS. 4C1 to 4C2, the magnetic materials (M) may be formed separately from the glass beads 21, and then the magnetic materials (M) and the glass bead 21 may be mixed and applied to the upper surface of the base layer 10.

More preferably, as shown in FIGS. 5A to 5B, the magnetic material (M) may be inserted into the glass bead 21 by using the magnetic material (M) as a seed, applying a viscous material to surround the magnetic material (M), applying a silica powder to the viscous material to adhere thereto by stirring, and then melting it by heating at a high temperature.

Meanwhile, rare minerals such as gold, silver, copper, and nickel are initially processes by crushing the ore to separate concentrates, followed by fine grinding and several sorting stages to remove tailings, ultimately leaving only the concentrates. In this case, the discarded tailings may be recycled as the magnetic materials (M) used as fine powder or seed of the present invention, thus promoting resource sustainability and economic efficiency.

In the bead layer forming step (S30), the glass beads 21 may be applied to the base layer 10 in a molten state before it is hardened and then attached by their own weight, or a predetermined pressure may applied to improve adhesion performance. However, an adhesive layer made of a transparent material such as polyester hot melt resin may be applied to ensure additional adhesion performance, without compromising the retroreflective performance.

Finally, the smart road marking 100 may be formed on the surface of the road 1 by the curing step (S40) of allowing the base layer 10, onto which the road marking composition is applied, and the bead layer 20, onto which the glass beads 21 containing the magnetic materials (M) are applied, to be cured for a certain period of time.

Meanwhile, FIGS. 6A1 to 6C2 illustrate smart road markings 100 using an adhesive sheet of the present invention, wherein the adhesive sheet (AS) may be provided with an adhesive layer 70 that exhibits excellent adhesion to the surface of asphalt or concrete roads, and a road marking layer 80 with a predetermined color and pattern may be integrally laminated on the top of the adhesive layer 70. In this case, the smart road marking 100 of the present invention is characterized by the fact that the bead layer 20, onto which the glass beads 21 containing magnetic materials (M) are applied, is integrally attached to the upper surface of the road marking layer 80 of the adhesive sheet (AS) by an adhesive material.

The glass bead 21 may be formed by applying a synthetic resin adhesive layer on the surface thereof and coating a magnetic material (M) onto the adhesive layer as shown in FIGS. 6A1 to 6A2, or by mixing finely divided magnetic materials (M) with a silica powder and melting the mixture by heating at a high temperature as shown in FIGS. 6B1 to 6B2. Moreover, as shown in FIGS. 6C1 to 6C2, the magnetic materials (M) may be formed separately from the glass beads 21, and then the magnetic materials (M) and the glass bead 21 may be mixed and integrated into the upper surface of the base layer 10.

Figures 7A, 7B:
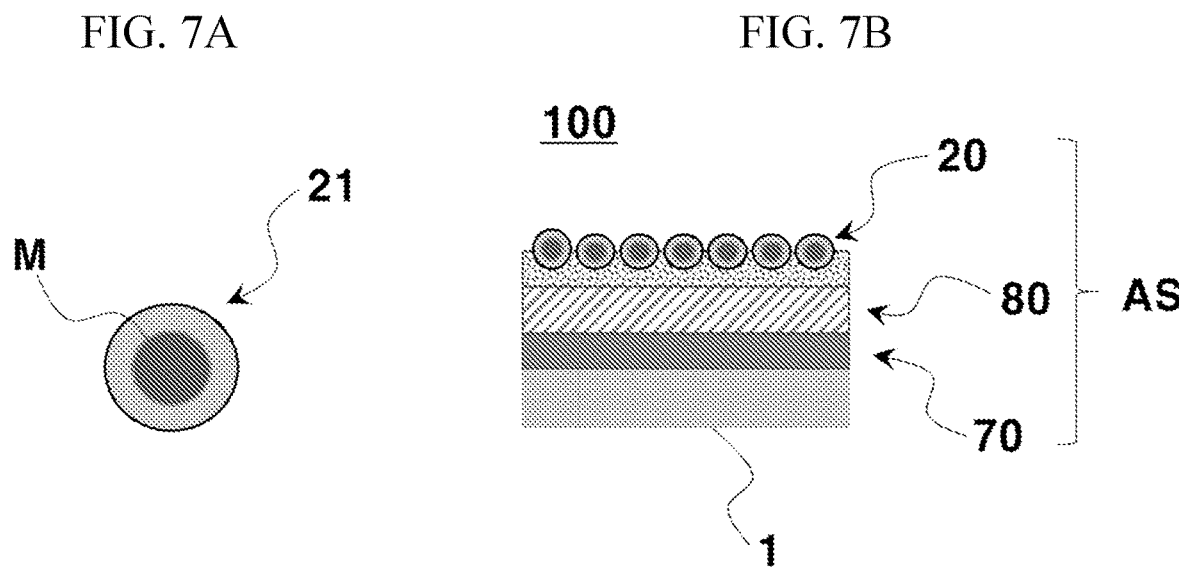
FIGS. 7A to 7B are conceptual cross-sectional views illustrating a smart road marking using glass beads and depending on a sheet adhesion method according to a preferred embodiment of the present invention.

More preferably, as shown in FIGS. 7A to 7B, the magnetic material (M) is used as a seed, a viscous material is applied to surround the magnetic material (M), and the silica powder is stirred to adhere to the viscous material. The magnetic material (M) can be manufactured to be introduced into the glass bead 21 by heating and melting it at a high temperature.

According to the various types of smart road markings 100 and their construction method (SM) of the present invention as described above, since the bead layer 20 is formed by applying the glass beads 21 containing magnetic materials to the upper surface of the base layer 10, onto which the road marking composition is applied, or to the road marking layer 80, it is possible for driving vehicles to accurately recognize the road marking using the radar sensor 200 even in adverse weather conditions or environmental obstacles without the reliance on vision-based road markings, while meeting the retroreflective performance of conventional road markings.

Figure 8:
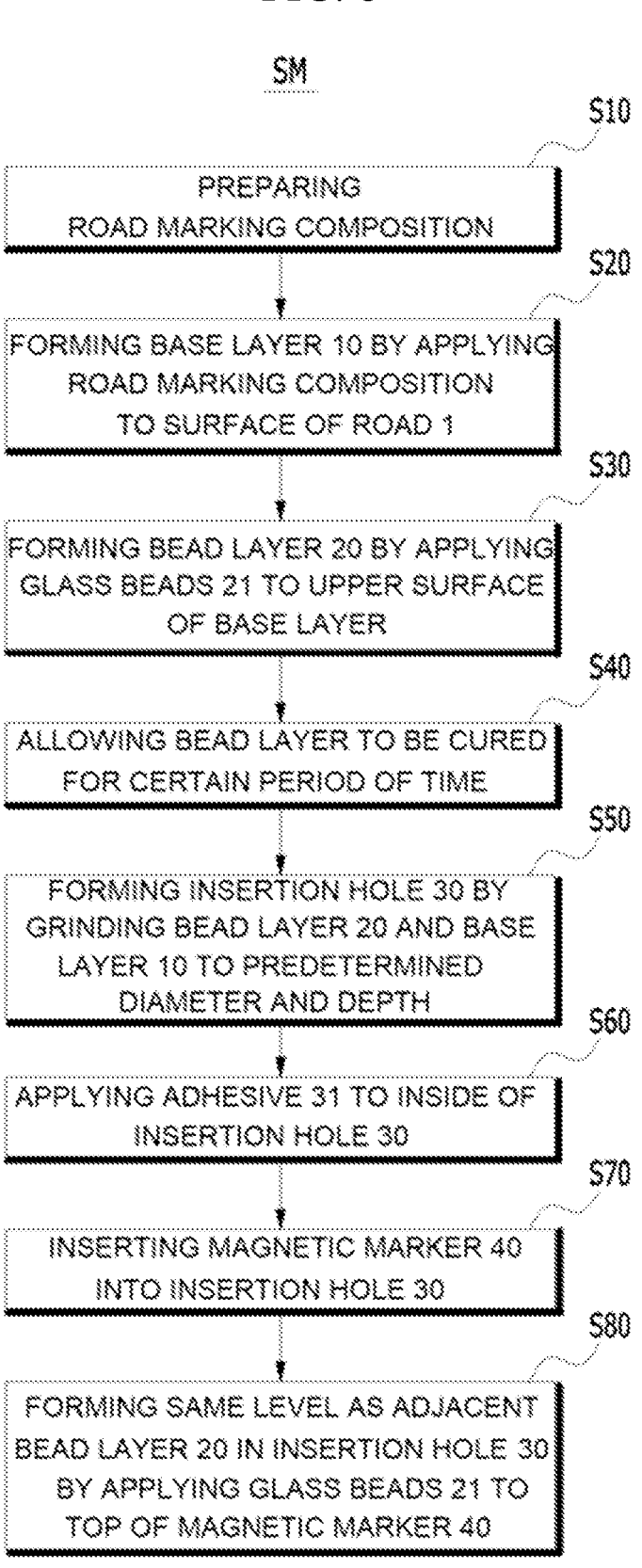
FIG. 8 is a block diagram illustrating a smart road marking construction method according to another embodiment of the present invention.

Meanwhile, as shown in FIG. 8, the smart road marking construction method (SM) according to another embodiment of the present invention may comprise a road marking composition preparation step (S10), a base layer forming step (S20), and a bead layer forming step (S30), a curing step (S40), an insertion hole forming step (S50), an adhesive application step (S60), and a magnetic marker insertion step (S70).

The road marking composition preparation step (S10) and the base layer forming step (S20) are the same as the above-described embodiment, and thus a repetitive description will be omitted. The bead layer forming step (S30) that follows is the step of forming a bead layer 20 by applying glass beads 21 containing magnetic materials (M) to the upper surface of the base layer 10.

The glass beads 21 forming the bead layer 20 of the present invention are intended to improve the retroreflectivity, and as previously mentioned, it is desirable to apply the glass beads 21 to the base layer 10 in a molten state before it is hardened to improve adhesion performance. However, it is also possible to apply an adhesive layer made of a transparent material such as polyester hot melt resin.

In this case, the glass beads 21 contain silica, and depending on the embodiment, the glass beads 21 may contain the magnetic materials (M) inserted therein as previously described.

Subsequently, when the base layer 10 and the bead layer 20 are cured to have a certain hardness through the curing step (S40), the insertion hole forming step (S50) is performed. The insertion hole forming step (S50) is the step of forming an insertion hole 30, through which a magnetic marker which will be described later can be inserted, by grinding the bead layer 20 and the base layer 10 to a predetermined diameter and depth.

Figure 9:
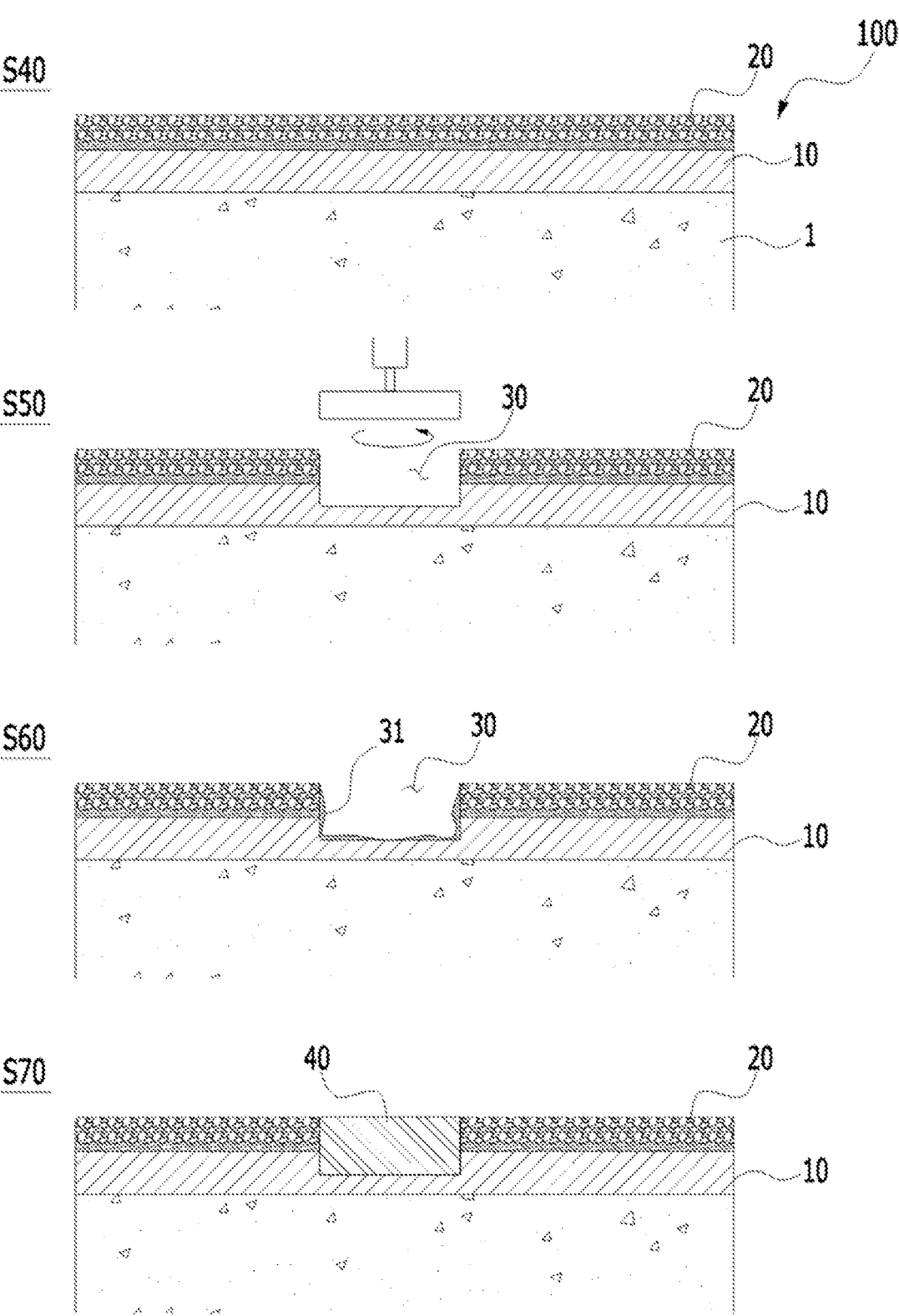
FIG. 9 is a cross-sectional view sequentially illustrating the smart road marking construction method of FIG. 8.

As shown in FIG. 9, the insertion hole 30 may be ground using a grinder to a diameter and depth corresponding to the shape of the magnetic marker 40 such that the magnetic markers 40 are inserted into the insertion holes 30 at regular intervals along the road marking. If the road marking is a dashed line, the insertion hole 30 may be formed so that the magnetic marker 40 is placed on each road marking. Moreover, it is desirable that the magnetic marker 40 be produced in a disk or cylindrical shape in consideration of the feasibility of the grinding processing.

The adhesive application step (S60) that follows is the step of applying an adhesive 31 to the inside of the insertion hole 30. The adhesive 31 may be uniformly applied to the bottom and sides of the ground insertion hole 30 by removing any contaminants such as moisture, dust, oil, etc. present inside the ground insertion hole 30, and the adhesive 31 is preferably epoxy resin.

After the adhesive 31 is applied to the inside of the insertion hole 30, the magnetic marker insertion step (S70) of inserting the magnetic marker 40 is performed. The magnetic marker 40 preferably has a disc shape or a cylindrical shape with a height of less than 10 mm. The magnetic marker 40 is also made of a magnetic material and is inserted into the insertion hole 30 and attached by the adhesive 31.

As a result, since the magnetic marker 40 is inserted and attached to the road marking 100, the driving vehicle can accurately recognize the location of the road marking even in adverse weather conditions or environmental obstacles without the reliance on vision-based road markings.

Figure 10:
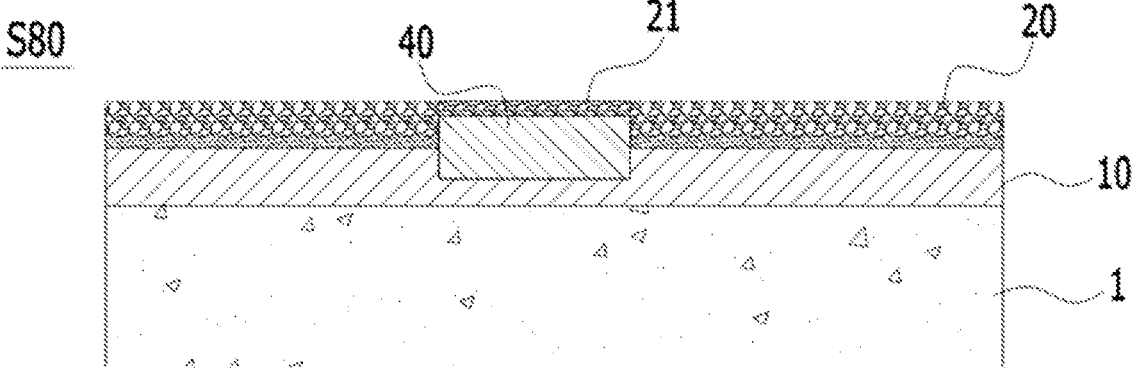
FIGS. 10 and 11 are cross-sectional views illustrating a smart road marking construction method according to a modified embodiment.

Meanwhile, as shown in FIG. 10, if the insertion hole 30 is ground to a height equal to the depth of the magnetic marker 40 and the magnetic marker 40 is inserted into the insertion hole 30, the same level as the adjacent bead layer 20 may be formed. However, the smart road marking construction method (SM) may further comprise a leveling step (S80) of forming the insertion hole 30 thicker and forming the same level as the adjacent bead layer 20 by additionally applying the glass beads 21 to the top of the magnetic marker 40. In this case, the glass beads 21 may be applied by means of an adhesive layer made of a transparent material such as polyester hot melt resin.

Moreover, in the smart road marking 100 using an adhesive sheet of the present invention, as shown in FIGS. 13A to 13B, the magnetic marker 40 may be integrally formed on the upper surface of the road marking layer 80 of the adhesive sheet (AS) by an adhesive material.

Figure 11:
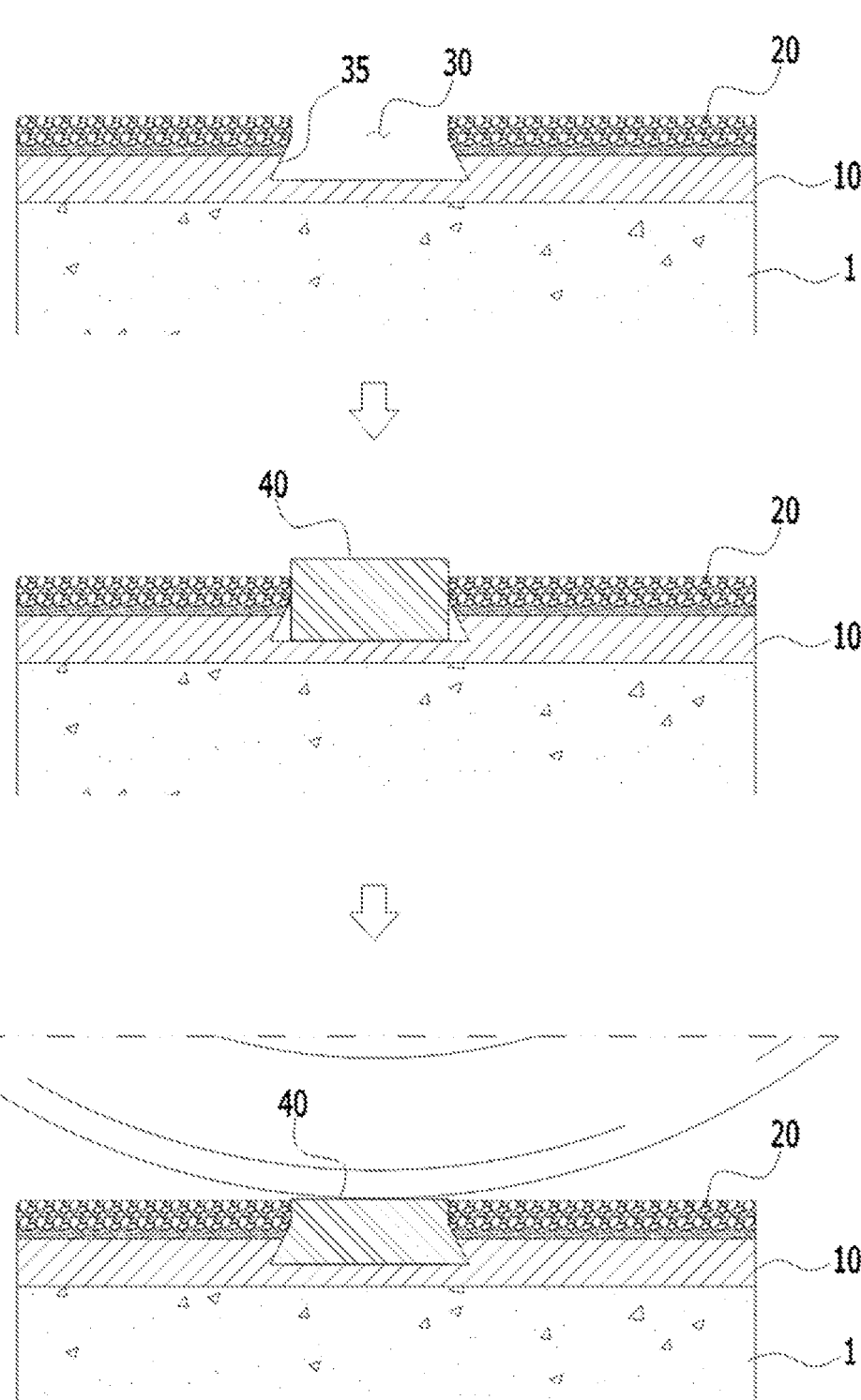

Furthermore, as shown in FIG. 11, the insertion hole 30 may comprise a deformation inducing portion 35 whose cross-section is extended toward one side. In this case, the magnetic marker 40 may be made of a ductile material such as copper, aluminum, or an alloy material with a certain degree of ductility, and upon application of upper loads, the magnetic marker 40 may be deformed into the deformation inducing portion 35 due to its ductility.

As a result, the magnetic marker 40 maintains a stable fixing force without being separated even under repeated wheel loads of a driving vehicle, thereby ensuring long-term durability. Preferably, the deformation inducing portion 35 is provided so that its cross-section is extended downward, and the magnetic marker 40 is provided to protrude upward from the adjacent bead layer 20, so that when an upper load is applied to the magnetic marker 40, it is deformed towards the deformation inducing portion 35, preventing detachment in the opposite direction.

Figure 14A:
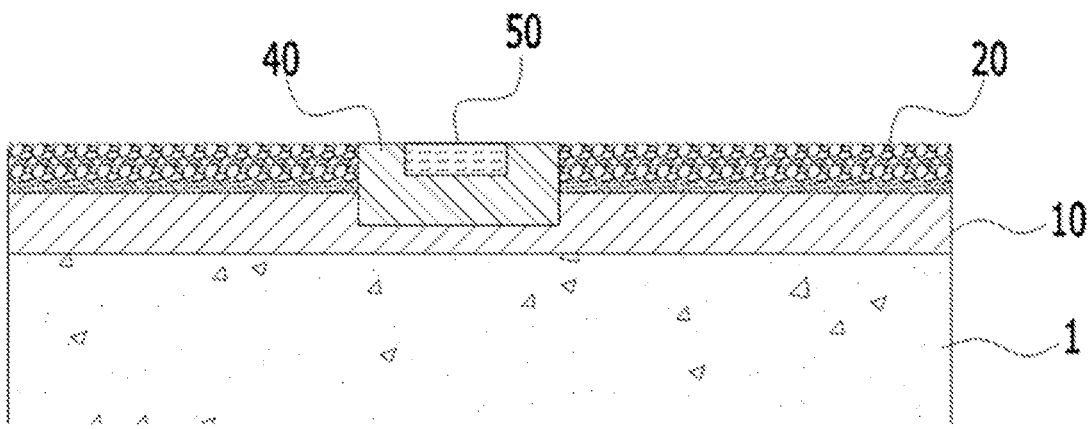
FIGS. 14A to 14B are cross-sectional views illustrating magnetic markers provided with RFID tags according to various embodiments of the present invention.
Figure 14B:
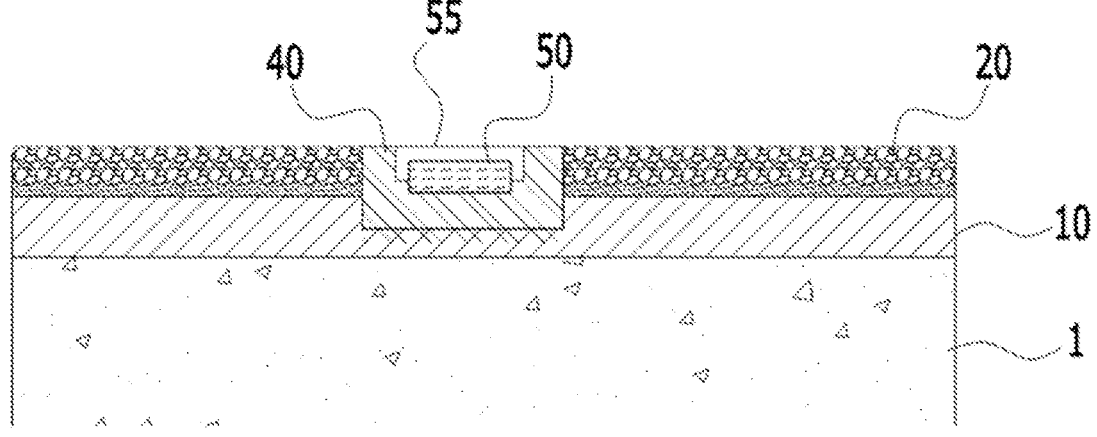

Meanwhile, as shown in FIGS. 12A to 13B, the magnetic marker 40 used in the smart road marking 100 and its construction method (SM) of the present invention may comprise an RFID tag 50 inserted therein. In particular, as shown in the cross-sectional view shown in FIG. 14A, the RFID tag 50 may be provided as a seed on the magnetic marker 40 so as be exposed upward. Alternatively, as shown in FIG. 14B, a non-magnetic cover 55 may be coupled to the upper surface of the magnetic marker 40 to cover the RFID tag 50, preventing interference of wavelengths caused by the magnetic materials.

The RFID tag 50 transmits information to the RFID receiver 400 of the driving vehicle, essentially functioning as a road sign to transmit lane location information to the vehicle. However, depending on the embodiment, it can provide the driving vehicles with traffic information based on specific characteristics of the road or lane, such as speed limit information for the road, information about the entry of general vehicles into bus-only lanes, information about entry times for variable lanes, traffic conditions based on the number of vehicles passing for a specific period of time, information about lane change permissions, etc.

In addition, as shown in FIGS. 15A to 15C, the RFID tag 50 provided in the smart road marking 100 and its construction method (SM) of the present invention may be designed to be inserted into a glass block 60 having a relatively large diameter.

Meanwhile, according to the autonomous driving system (S) using the smart road markings of the present invention, as shown in FIG. 2, the radar sensor 200 mounted on the vehicle detects road marking information including location information from the magnetic material (M) or the magnetic marker 40 of the smart road marking 100 as described above. At this time, the road marking information may be location information about a lane, stop line, or other area, and the road marking information may also contain information about the entry into the corresponding lane.

When the road marking information is recognized by the radar sensor 200, the driving assistance device 300 mounted on the vehicle can control the vehicle's movement based on the road marking information. As a result, even in the situations where the driving vehicle deviates from its lane on a restricted road or attempts to change the lanes on a road where the lane change is prohibited, the vehicle can autonomously correct its driving direction.

Figure 16A:
FIGS. 16A to 16F shows images sequentially illustrating the principle of road marking recognition according to an embodiment of the present invention.
Figure 16B:
Figure 16C:
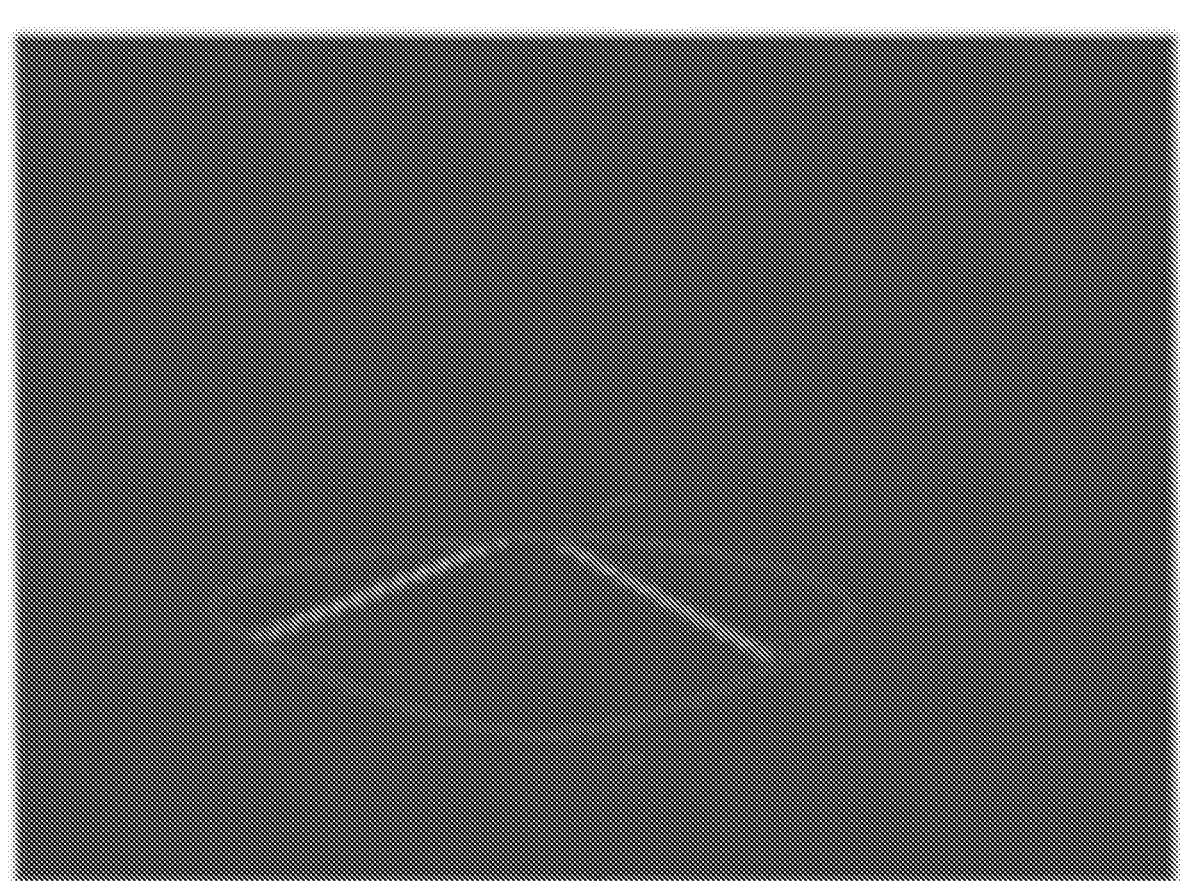
Figure 16D:
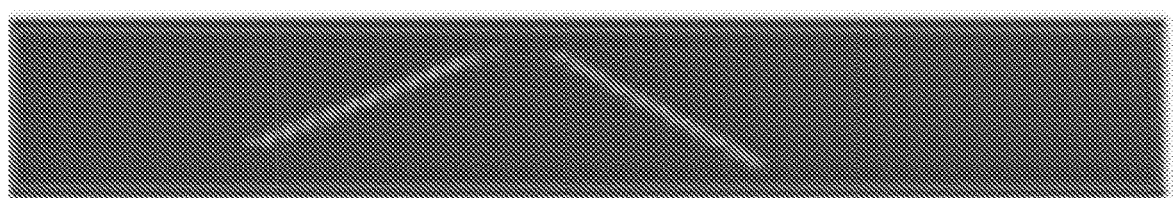
Figure 16E:
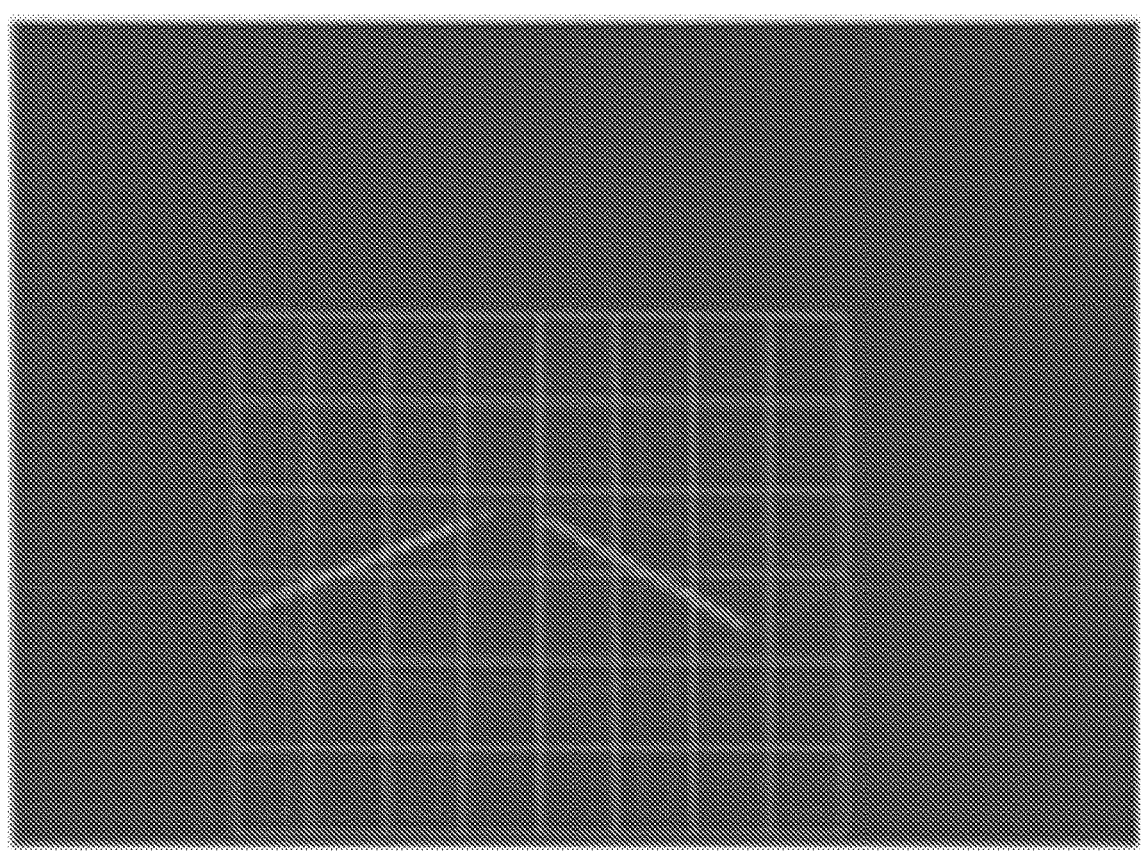
Figure 16F:
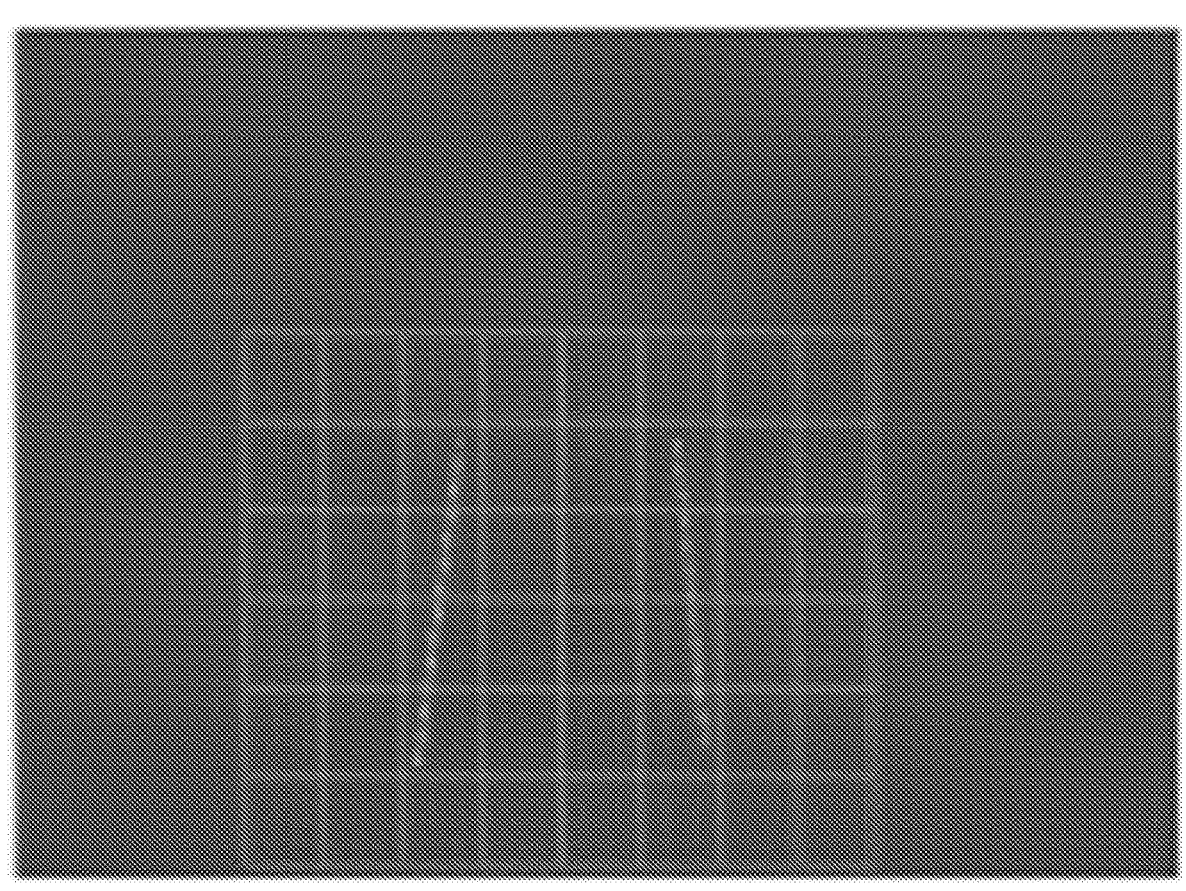

FIGS. 16A to 16F illustrates the principle by which a road marking identification module provided in the driving assistance device 300 according to an embodiment of the present invention recognizes lanes as follows: in FIG. 16B, the radar sensor 200 collects data for the detection area; in FIG. 16C then, the road marking identification module removes similar noise and edges only road markings representing lanes; in FIG. 16D, it extracts the region of interest (ROI); in FIG. 16E, it extracts a critical area of the lane from the matrix coordinates; and in FIG. 16F, it linearizes the lane two-dimensionally and recognizes it, thereby determining in real time whether the driving vehicle deviates from its lane. Afterwards, the driving control module corrects the vehicle's direction based on the determined driving information.

Additionally, the vehicle may be equipped with an RFID receiver 400 to receive road marking information from the RFID tag 50. The RFID tag 50 can primarily transmit lane location information to the vehicle and can transmit various other road marking information as well.

In particular, the RFID receiver 400 of the driving vehicle may communicate with the central control server 500 to receive real-time information about the driving vehicle from the RFID tag 50, thereby collecting the speeds of individual vehicles as well as the overall traffic conditions on the road. Additionally, it is possible to obtain real-time information about traffic law violations using the information received from the RFID receiver 400 of the vehicle driving on variable lanes or bus-only lanes.

It will be appreciated by those skilled in the art to which the present invention pertains that the smart road marking construction method (SM), the smart road marking 100, and the autonomous driving system (S) using the same according to the present invention as described above can be implemented in other specific forms without changing the technical spirit or essential features of the present invention.

Therefore, the embodiments described above should be understood as illustrative in all aspects, instead of limiting. The scope of the present disclosure is defined not by the detailed description, but by the appended claims and their equivalents, and the meaning and scope of the claims and all changes or modifications derived from their equivalents should be construed as being included in the scope of the present disclosure.

Brief Description of Reference Numerals

SM: smart road marking construction method
S10: road marking composition preparation step
S20: base layer forming step
S30: bead layer forming step
S40: curing step
S50: insertion hole forming step
S60: adhesive application step
S70: magnetic marker insertion step -continued Brief Description of Reference Numerals

| | |
|---|---|
| 1: road | 10: base layer |
| 20: bead layer | 21: glass bead |
| M: magnetic material | 30: insertion hole |
| 40: magnetic marker | 50: RFID tag |
| 55: non-magnetic cover | 60: glass block |
| AS: adhesive sheet | 70: adhesive layer |
| 80: road marking layer | |
| S: autonomous driving system using smart road markings | |
| 100: smart road marking | 200: radar sensor |
| 300: driving assistance device | 400: RFID receiver |
| 500: central control server | |

What is claimed is:

1. A smart road marking construction method comprising:
a step (S10) of preparing a road marking composition by mixing a paint and a hardener;
a step (S20) of forming a base layer (10) by applying the road marking composition to an upper surface of a road (1);
a step (S30) of forming a bead layer (20) by applying glass beads (21) in which magnetic materials (M) are inserted by using the magnetic materials (M) as seeds, applying a viscous material to surround the magnetic materials (M), applying a silica powder to the viscous material to adhere thereto by stirring, and melting it by heating, to an upper surface of the base layer (10); and
a step (S40) of allowing the resulting bead layer to be cured for a certain period of time.

2. A smart road marking (100) comprising an adhesive sheet (AS) to be attached to an upper surface of a road (1), wherein the adhesive sheet (AS) is provided with an adhesive layer (70) to be attached to the asphalt or road surface, a road marking layer (80) is integrally laminated on the top of the adhesive layer (70), and a bead layer (20) comprising glass beads (21) in which magnetic materials (M) are inserted by using the magnetic materials (M) as seeds, applying a viscous material to surround the magnetic materials (M), applying a silica powder to the viscous material to adhere thereto by stirring, and melting it by heating, to an upper surface of the road marking layer (80).

3. A smart road marking (100) comprising an adhesive sheet (AS) to be attached to an upper surface of a road (1), wherein the adhesive sheet (AS) is provided with an adhesive layer (70) to be attached to the asphalt or road surface, a road marking layer (80) is integrally laminated on the top of the adhesive layer (70), and a bead layer (20) comprising glass beads (21) containing magnetic materials (M) is integrally attached to an upper surface of the road marking layer (80), and a magnetic marker (40) is attached to an upper surface of the road marking layer (80).

4. The smart road marking (100) of claim 3, wherein the magnetic marker (40) comprises an RFID tag (50) inserted therein.

5. A smart road marking construction method comprising:
a step (S10) of preparing a road marking composition by mixing a paint and a hardener;
a step (S20) of forming a base layer (10) by applying the road marking composition to an upper surface of a road (1);
a step (S30) of forming a bead layer (20) by applying glass beads (21) to an upper surface of the base layer (10);
a step (S40) of allowing the resulting bead layer to be cured for a certain period of time;

a step (S50) of forming an insertion hole (30) by grinding the bead layer (20) and the base layer (10) to a predetermined diameter and depth;

a step (S60) of applying an adhesive (31) to the inside of the insertion hole (30); and a step (S70) of inserting a magnetic marker (40) into the insertion hole (30).

6. The smart road marking construction method of claim 5, wherein the magnetic marker (40) comprises an RFID tag (50) inserted therein.

7. The smart road marking construction method of claim 5, further comprising a step (S80) of forming the same level as the adjacent bead layer (20) in the insertion hole (30) by applying glass beads (21) to the top of the magnetic marker (40).

8. The smart road marking construction method of claim 5, wherein the insertion hole (30) comprises a deformation inducing portion (35) whose cross-section is extended toward one side, and the magnetic marker (40) is made of a ductile material to be deformed into the deformation inducing portion (35) by an upper load.

* * * * *